No. 628,562. Patented July 11, 1899.
J. E. THORNTON & J. P. LEA.
PNEUMATIC WHEEL.
(Application filed Feb. 28, 1899.)
(No Model.) 3 Sheets—Sheet 1.
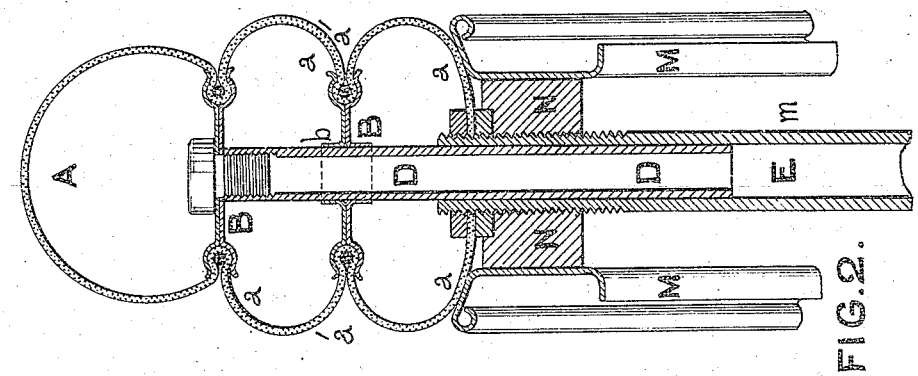
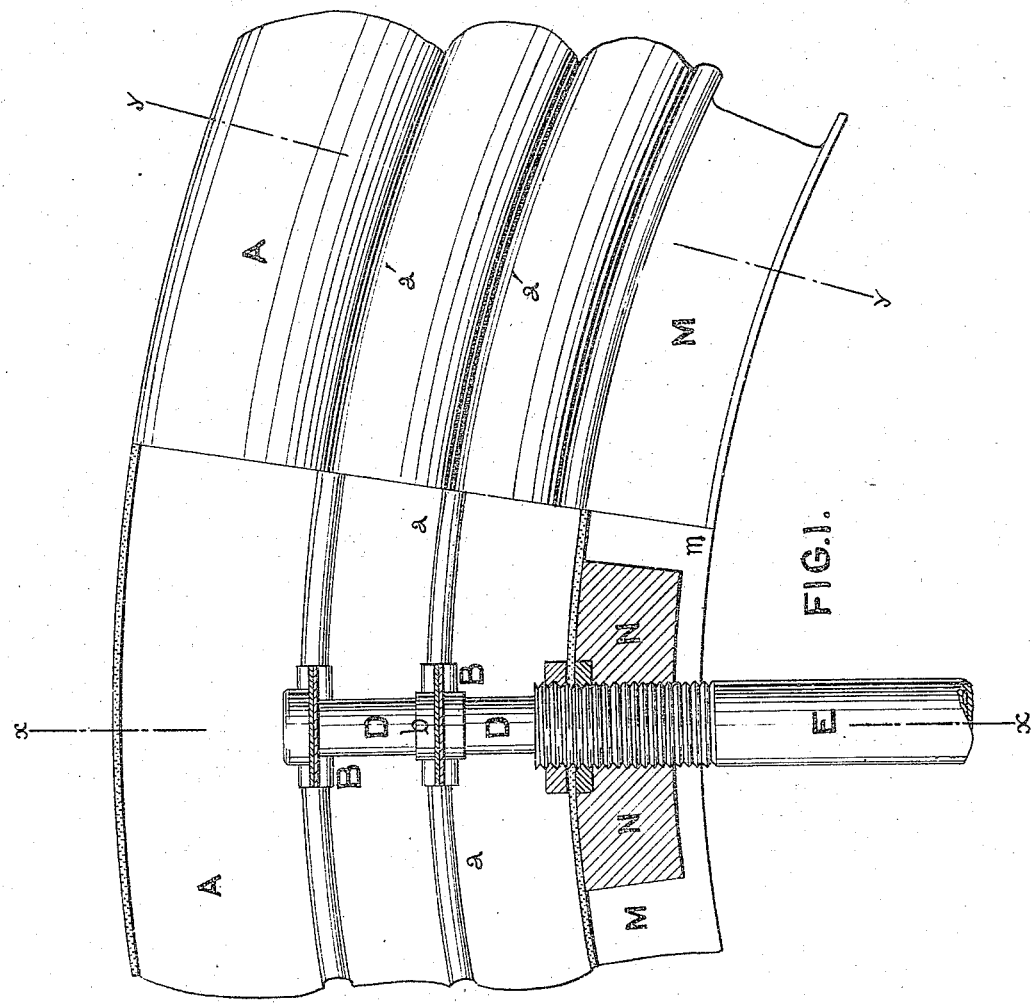
WITNESSES.
E. Howard
J. F. Gill
INVENTORS.
J. E. Thornton
J. P. Lea No. 628,562. Patented July 11, 1899.
J. E. THORNTON & J. P. LEA.
PNEUMATIC WHEEL.
(Application filed Feb. 28, 1899.)
(No Model.) 3 Sheets—Sheet 2.
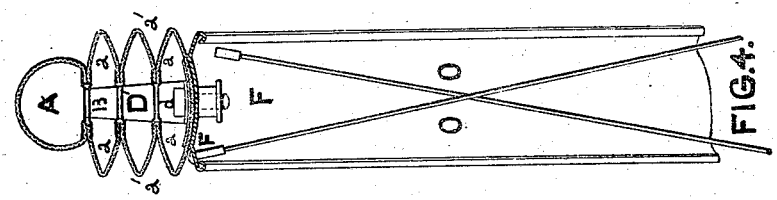
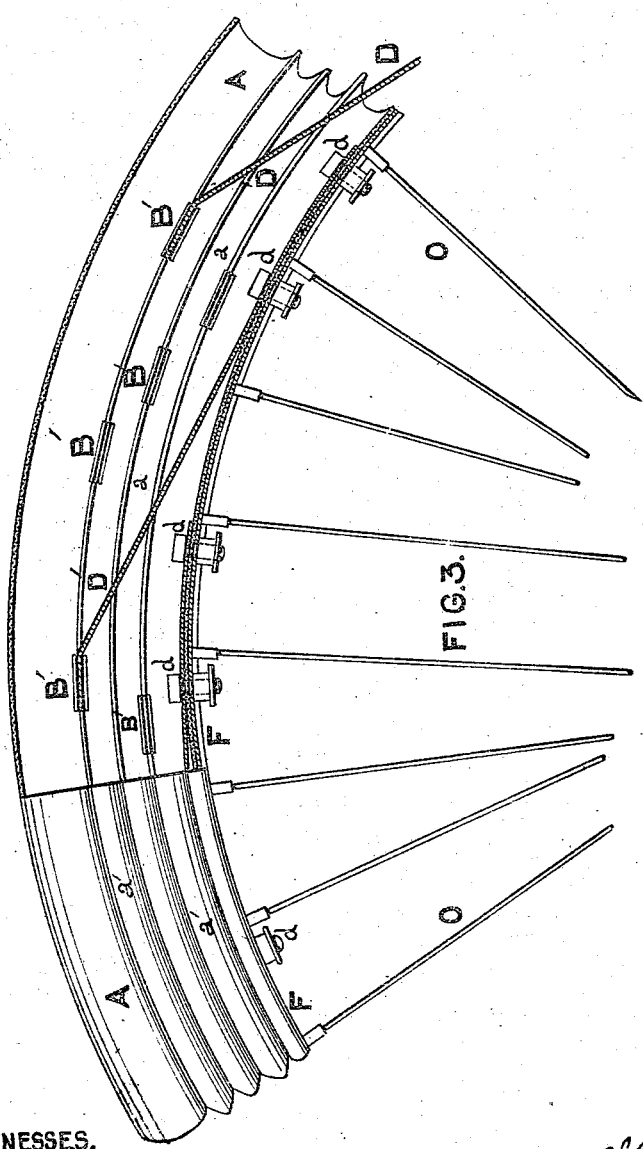
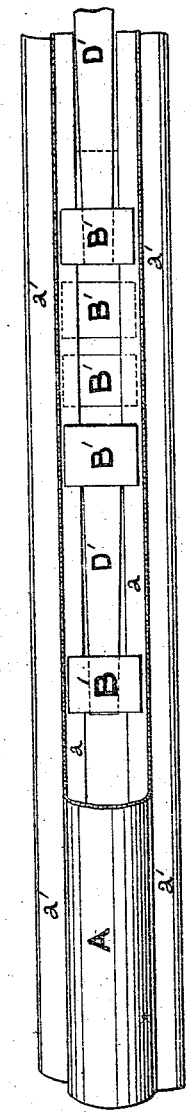
WITNESSES.
E. Howard.
J. F. Gill.
INVENTORS.
J. E. Thornton
J. P. Lea
by Aiden O'Brien
atty.

No. 628,562. Patented July 11, 1899.
J. E. THORNTON & J. P. LEA.
PNEUMATIC WHEEL.
(Application filed Feb. 28, 1899.)

(No Model.) 3 Sheets—Sheet 3.

WITNESSES.
E. Howard
J. F. Gill

INVENTORS.
J. E. Thornton.
J. P. Lea.

UNITED STATES PATENT OFFICE.

JOHN EDWARD THORNTON, OF ALTRINGHAM, AND JAMES POLLARD LEA, OF MANCHESTER, ENGLAND.

PNEUMATIC WHEEL.

SPECIFICATION forming part of Letters Patent No. 628,562, dated July 11, 1899.

Application filed February 28, 1899. Serial No. 707,181. (No model.)

*To all whom it may concern:*

Be it known that we, JOHN EDWARD THORNTON, residing at Altringham, in the county of Chester, and JAMES POLLARD LEA, residing at Hulme, Manchester, in the county of Lancaster, England, subjects of the Queen of Great Britain, have invented certain new and useful Improvements in Pneumatic Wheels, of which the following is a specification.

This invention relates to improvements in the construction of wheels fitted with pneumatic tires, whereby lightness, stiffness, and strength are secured in the frame of the wheel, greatly-increased resiliency in running over obstacles and improved wearing qualities in the tire, and in the combination of the wheel and the tire the avoidance of undue dragging and driving strains transmitted through the tire material and the ability to get at, examine, and repair the interior without the necessity of removing the tire from the wheel.

It consists, essentially, in constructing the tires with expanding or accordion-shaped sides connected to the rim by means of ties or strips and securing lateral stability and transmitting driving strains direct from the rim to the periphery or near it, so as not to pass through and distress the material of the tire.

It will be fully described with reference to the accompanying drawings.

Figure 6:
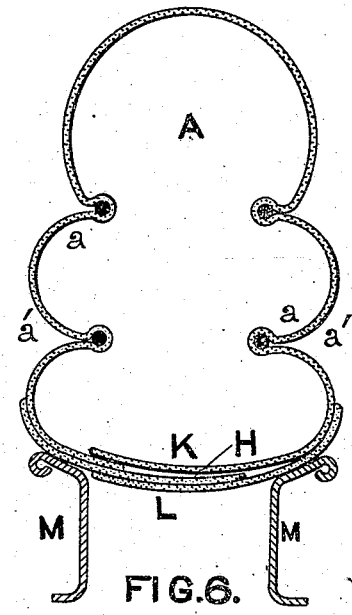
Figure 7:
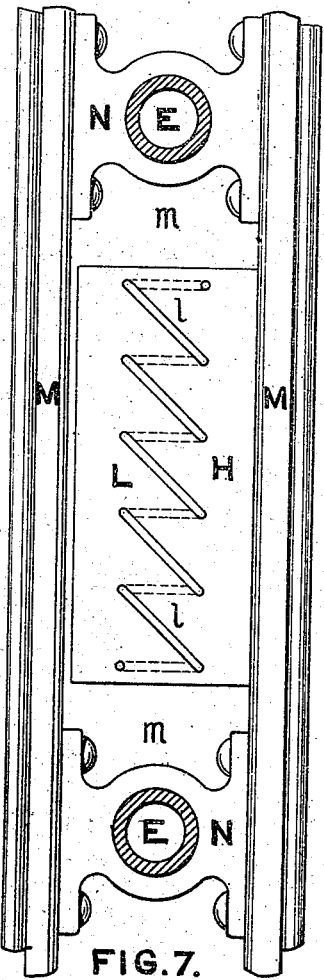

Figure 1 is a side elevation of part of a wheel, partly in section; Fig. 2, a transverse section of same on line $x$ $x$, Fig. 1; Fig. 3, a side elevation of part of a wheel, partly in section, showing a modified arrangement of the invention; Fig. 4, a transverse section of Fig. 3; Fig. 5, a plan, partly in section, of Fig. 3; Fig. 6, a transverse section of Fig. 1 on line $y$ $y$, showing the flaps L and K; Fig. 7, a plan of under side of tire of Figs. 1 and 6, showing the opening H and lacing $l$.

The tire A is constructed of any suitable flexible material capable of containing air or vapor under pressure and strong enough to resist a high degree of pressure. It is shaped at the sides to what may be termed "accordion" shape with a series of reëntering angles $a$, and the tire when inflated is of very much greater depth measured radially than is usual or than it is in width. The accordion-shaped sides $a'$ work or move easily when compressed by passing over any obstacle on the road without greatly extending or expanding laterally or in width. This form of cross-section of tire is maintained and the sides $a'$ secured in position by internal cross-ties B B', which are placed at intervals and connect the angle $a$ or apex of one side with that of the corresponding side at the opposite side of the tire.

The cross-ties B may be metal clips clamped into the interior of the angle $a$ of the sides $a'$, as in Fig. 2, or they may be strips of flexible material B', secured by cement or otherwise, as in Fig. 4. The cross-ties B prevent lateral extension of the tire under the pressure of compressed air.

At the bottom of the angle $a$ of the sides $a$ flexible ring or cord of suitable material may be inserted, as in Fig. 2, and the internal stays or cross-ties B grip over these and securely hold and connect the sides of the tire without piercing it.

To give stability to the tire and to transmit the driving force direct to the periphery or tread of the tire from the rim of the wheel, the periphery or tread of the tire is connected by movable ties or struts D or D' with the rim of the wheel. The ties D may be in the form of sliding hollow bars or rods passing down into the interior of the spokes E, or they may be in the form of tie-pieces D', secured by bolts or screws $d$ to the periphery of the rim F, Figs. 3, 4, and 5. When the wheel meets a large obstacle, the struts D slide up into the sockets E to pass, and thus the resiliency of the tire is not interfered with.

The sliding ties or struts D in Figs. 1 and 2 are connected by sleeves $b$ to the cross-ties B, and the struts or ties D' in Figs. 3, 4, and 5 are connected to the cross-ties B' by cement or other suitable means.

The tire may be made with a number of openings H, through which access may be had to the interior in order to place the cross-ties B B' and the struts or ties D in place and to examine and repair any puncture, such repair being effected on the inside. The holes or openings H are of considerable size and are closed by internal flaps K, which are held in position by the pressure of air. These flaps on the exterior may be covered by other flaps L, held in position by lacing $l$ or otherwise, so that they are easily accessible.

In the form shown in Figs. 1 and 2 the wheel-rim is made of two rings or hoops M, of steel or suitable material, placed side by side at a convenient distance apart and secured to each other at intervals by a number of crosspieces N, to which they are firmly bolted or riveted. This construction of rim forms a number of spaces $m$ between the outer rings of the wheel-rim. The openings H and covering-flaps L of the tires are placed over the spaces $m$ of the rim, so that the tire can be opened, examined, and repaired without removing it from the wheel. The two rings M are connected by spokes E with a central hub, the spokes preferably engaging with the cross-blocks N; but they may connect direct with the rim, as in Figs. 3 to 5.

What we claim as our invention and desire to protect by Letters Patent, is—

1. In a pneumatic wheel the combination of a tire of accordion shape with reëntering side angles, cross-ties to give lateral stability connected to the side and tie-struts connected to the rim and the periphery to transmit the driving stress substantially as described.

2. In a pneumatic wheel the combination of the accordion tire with reëntering side angles, the cross-ties connecting the sides the movable tie-struts sliding in the spokes and the hollow-ended spokes substantially as described.

3. In a pneumatic wheel the combination of the accordion tire with reëntering side angles, the cross-ties connecting the sides the movable tie-struts sliding in the spokes the hollow-ended spokes the blocks N to which the spokes are attached and the two rings or hoops M forming the tire of the wheel substantially as described.

4. In a pneumatic wheel the combination with the accordion tire with reëntering side angles and cross-ties connecting the sides provided with openings H of the internal flaps K and the external flaps L substantially as described.

5. In a pneumatic wheel the combination with the accordion tire with reëntering side angles and cross-ties connecting the sides provided with openings H of the internal flaps K and the external flaps L the two hoops M and blocks N forming the rim and by which the tire is supported substantially as described.

In witness whereof we have hereunto signed our names in the presence of two subscribing witnesses.

JOHN EDWARD THORNTON.
JAMES POLLARD LEA.

Witnesses:
J. OWDEN O'BRIEN,
R. OVENDALE.